US005703324A

United States Patent [19]

Harder

[11] Patent Number: 5,703,324

[45] Date of Patent: Dec. 30, 1997

[54] SHIELDED BANANA PLUG WITH DOUBLE SHROUD AND INPUT RECEPTACLE

[75] Inventor: Piet Harder, Borne, Netherlands

[73] Assignee: Fluke Corporation, Everett, Wash.

[21] Appl. No.: 640,387

[22] Filed: Apr. 30, 1996

[51] Int. Cl.$^6$ .......................... H02G 15/02; H02G 15/24

[52] U.S. Cl. ...................... 174/21 C; 174/74 R; 439/578

[58] Field of Search .................................. 174/21 C, 28, 174/74 R, 75 B, 77 S; 439/578, 579, 580, 581, 610

[56] References Cited

U.S. PATENT DOCUMENTS

| | | | |
|---|---|---|---|
| 2,740,095 | 3/1956 | Somes | 174/71 R X |
| 3,735,021 | 5/1973 | Bonis et al. | 174/86 X |
| 4,173,386 | 11/1979 | Kauffman et al. | 339/177 R X |
| 4,606,603 | 8/1986 | Cairns | 350/96.21 |
| 5,060,373 | 10/1991 | Machura et al. | 29/858 X |

FOREIGN PATENT DOCUMENTS

| | | |
|---|---|---|
| 061270 | 1/1948 | Netherlands . |

*Primary Examiner*—Kristine L. Kincaid
*Assistant Examiner*—Chau N. Nguyen
*Attorney, Agent, or Firm*—Richard A. Koske

[57] ABSTRACT

A shielded banana plug attached to one end of a test lead is suitable for connection to a corresponding input receptacle in an instrument. The plug includes an inner conductor having an first nonconductive shroud which is concentric with and spaced apart from the inner conducter. The shroud extends beyond the tip of the inner conductor. A conductive shield is concentric with and outside the first nonconductive shroud and is recessed from the end of the shroud. A nonconductive outer shroud is spaced apart from and concentric with the shield and extends beyond the tip of the inner conductor. An input receptacle suitable for mating with the shielded banana plug includes an conductive inner sleeve for receiving the inner conductor, a nonconductive shroud that is concentric with and outside the inner sleeve and which extends beyond the inner sleeve, and a conductive outer sleeve for receiving the conductive shield. The input receptacle is also suitable for mating with a conventional, nonshielded banana plug.

7 Claims, 3 Drawing Sheets

SHIELDED BANANA PLUG WITH DOUBLE SHROUD AND INPUT RECEPTACLE

BACKGROUND OF THE INVENTION

The present invention relates generally to instrumentation test lead plugs and input receptacles and, more particularly, to shielded test lead plugs and their corresponding input receptacles for electronic test and measurement instruments.

Electronic test and measurement instruments are used to measure a variety electrical parameters such as voltage, current and impedance. One or more test leads plugged into the instrument typically couple the instrument to the signal or parameter to be measured. One end of the test lead includes a probe and the opposite end consists of a plug which may be inserted into the instruments' input receptacle. A conventional test lead plug is commonly referred to as a "banana plug". Banana plugs are used with nonshielded, single conductor test leads. Some banana plugs have a nonconductive shroud to prevent accidental contact with the conductor. The shroud may also provide a higher voltage rating for the plug.

In order to make a measurement with an instrument using test leads having conventional banana plugs, the user must connect two test leads to two corresponding input receptacles in the instrument. One disadvantage of using test leads with conventional banana plugs is the need for multiple (i.e., at least two) test leads and input receptacles. Multiple input receptacles increase the cost of the instrument and take up valuable space.

Conventional banana plugs are unshielded and therefore measurements made with these test leads may be subject to the effects of nearby electric and magnetic fields. As a result, measurement of low amplitude or high frequency signals are typically made using shielded test leads. Conventional shielded test leads, such as coaxial cables, use BNC connectore typically rated for use with lower voltages than test leads using banana plugs. In applications where higher voltages are present, a shielded probe that attenuates the signal by a factor of 10 or 100 may be used to reduce the voltage level present at the BNC connector and input receptacle. Attenuator probes are more expensive than the conventional probes used with unshielded leads and banana plugs.

Accordingly, there is a need for test leads that may be used with electronic test and measurement instruments which are capable of being used in relatively low and high voltage applications as well as in applications normally requiring shielded test leads. The present invention, directed to a shielded test lead banana plug and the corresponding input receptacle, is designed to achieve these results.

SUMMARY OF THE INVENTION

As will be appreciated from the foregoing summary, the present invention provides a shielded banana plug and input receptacle suitable for use with electronic test and measurement instruments. In accordance with a preferred embodiment of the present invention, the shielded banana plug includes an inner conductor and a nonconductive first or inner shroud which is concentric with and spaced apart from the inner conductor. The inner shroud is outside the inner conductor and extends beyond the tip of the inner conductor. A conductive shield is concentric with and outside the first nonconductive shroud and is recessed from the end of the inner shroud. A nonconductive second or outer shroud is spaced apart from and concentric with the shield and extends beyond the tip of the inner conductor. The input receptacle includes an conductive inner sleeve for receiving the inner conductor, a nonconductive sheath that is concentric with and outside the inner sleeve and which extends beyond the inner sleeve, and a conductive outer sleeve for receiving the conductive shield. The input receptacle is also suitable for mating with a conventional, nonshielded banana plug.

As will be appreciated with the foregoing summary, the present invention provides a shielded banana plug and compatible input receptacle suitable for use with a test and measurement instrument.

BRIEF DESCRIPTION OF THE DRAWINGS

The foregoing and other advantages of this invention will become more readily appreciated as the same becomes better understood by reference to the following description of a preferred embodiment taken in conjunction with the accompanying drawings, wherein.

DESCRIPTION OF THE PREFERRED EMBODIMENT

Figure 1:
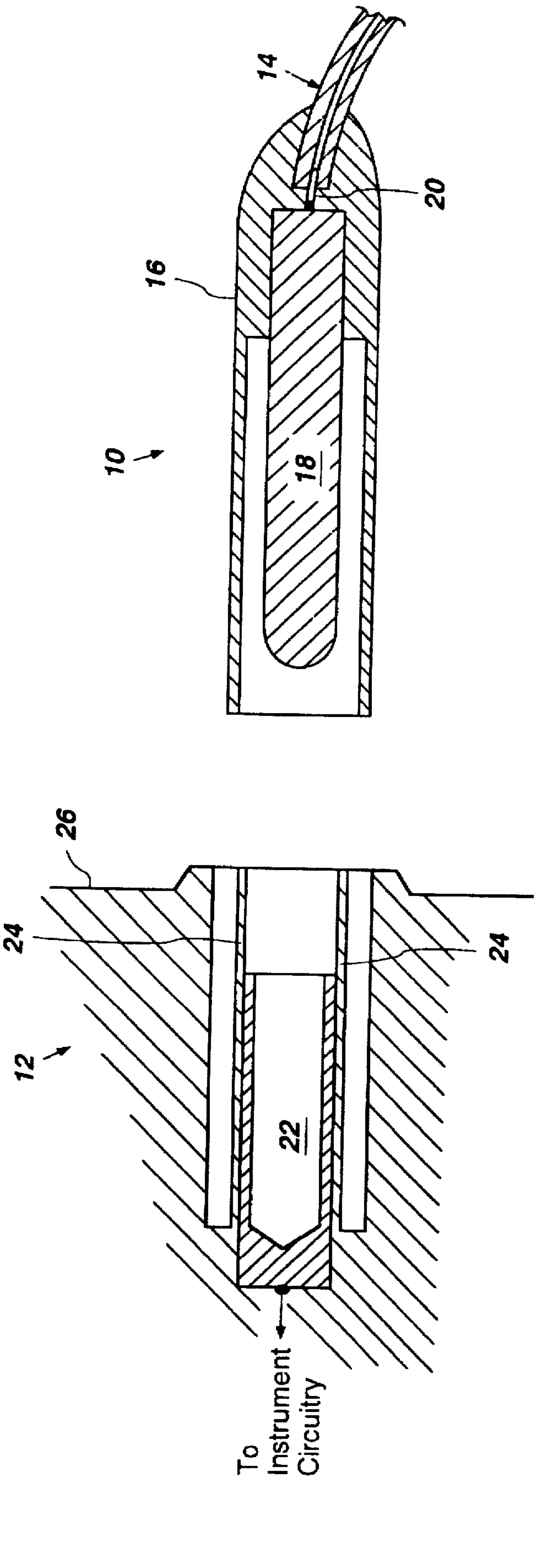
FIG. 1 (Prior Art)
FIG. 1 is a sectional side view of a prior art banana plug and input receptacle.

FIG. 1 illustrates, in a sectional side view, a prior art banana plug 10 and input receptacle 12. One end of plug 10 is connected to a cable 14 forming a portion of a test lead suitable for use with a test and measurement instrument. Plug 10 comprises nonconductive outer shroud 16 and an inner conductor 18. One end of inner conductor 18 is connected to the conductor (e.g., wire) 20 of the cable. One end of shroud 16 terminates at cable 14. The other end of shroud 16 extends beyond the end of the inner conductor 18 opposite the cable 14. A portion of shroud 16 is spaced apart from inner conductor 18.

Input receptacle 12 includes a conductive inner sleeve 22 open at one end and connected to instrument circuitry at the other end. Sleeve 22 is surrounded on the sides by a nonconductive shroud 24. One end of shroud 24 is open and extends to the open end of sleeve 22. The receptacle shown in FIG. 1 is recessed in an instrument housing or case 26. Case 26 includes an opening near the open ends of sleeve 22 and shroud 24. A portion of the case is spaced apart from the shroud so as to form a cavity between the shroud 24 and the case 26.

The plug and receptacle are dimensioned so that when they are mated (not shown), the receptacle 12 receives the plug 10. Inner conductor 18 is received and makes electrical contact with sleeve 22. Shroud 24 is received in the cavity between inner conductor 18 and shroud 16 of the plug 10. Thus, when the plug is fully seated in the receptacle, the test lead cable is electrically connected to the measurement circuitry of the instrument. When the plug 10 and receptacle 12 are not connected, or as they are being connected, the shrouds 16, 24 and case 26 provide a degree of safety by preventing the user from touching the conductive portions of the plug or receptacle.

Figure 2:
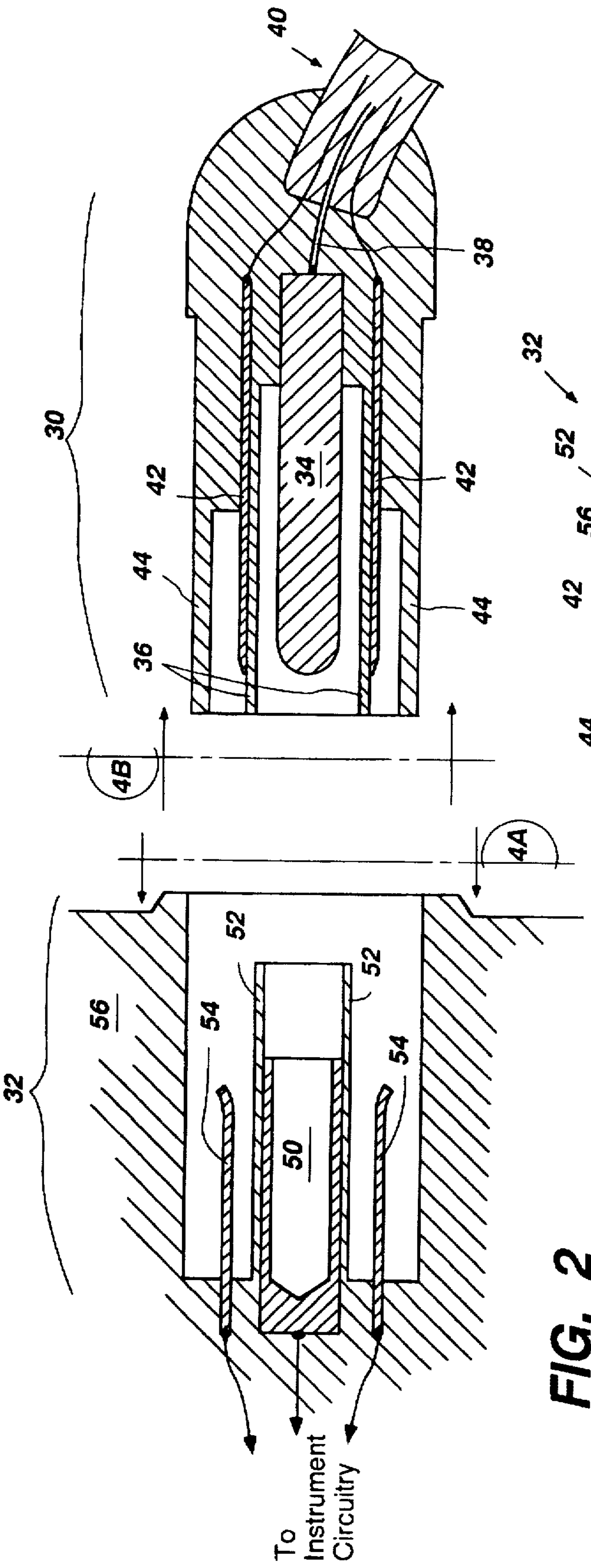
FIG. 2 is a sectional side view of a shielded banana plug and input receptacle according to the present invention.

FIG. 2 illustrates, in a sectional side view, a shielded banana plug 30 and input receptacle 32 according to a preferred embodiment of the present invention. The plug 30 includes an inner conductor 34 and an nonconductive first or inner shroud 36, a portion of which is spaced apart from inner conductor 34. The inner conductor, is electrically conductive and includes a first end for connecting to a conductor (e.g., wire) 38 of a shielded test lead 40. The inner shroud 36 surrounds inner conductor 34 and includes a first end adjacent a first end of inner conductor 34. A portion of inner shroud 36, including a second end of the shroud, is spaced apart from the sides of inner conductor 34 and extends beyond a second end of the inner conductor. A conductive shield 42 is adjacent an outer surface of the nonconductive inner shroud 36. A first end of shield 42 may be connected to the shielding of test lead 40. A second end of shield 42 terminates short of the second end of shroud 36. A nonconductive second or outer shroud 44 surrounds the shield 42 and includes a first end adjacent an outer surface of the shield 42. A portion of outer shroud 44, including a second end of the shroud, is spaced apart from the sides of shield 42 and extends to the second end of the inner shroud 36.

The input receptacle includes an electrically conductive inner sleeve 50 that is open at a first end. A second end of inner sleeve 50 may be connected to instrument circuitry. A nonconductive shroud 52 surrounds sleeve 50 and has a first end that extends beyond the open first end of sleeve 50. An electrically conductive outer sleeve 54 surrounds and is spaced apart from shroud 52. Outer sleeve 54 is open at a first end which terminates short of the open end of shroud 52. The input receptacle 32 as shown in FIG. 2 is recessed in an instrument housing or case 56. Case 56 includes an opening near the open ends of sleeve 50 and shroud 52. A portion of the case is spaced apart from the outer sleeve 54 so as to form a cavity between sleeve 54 and the case 56.

Figure 3:
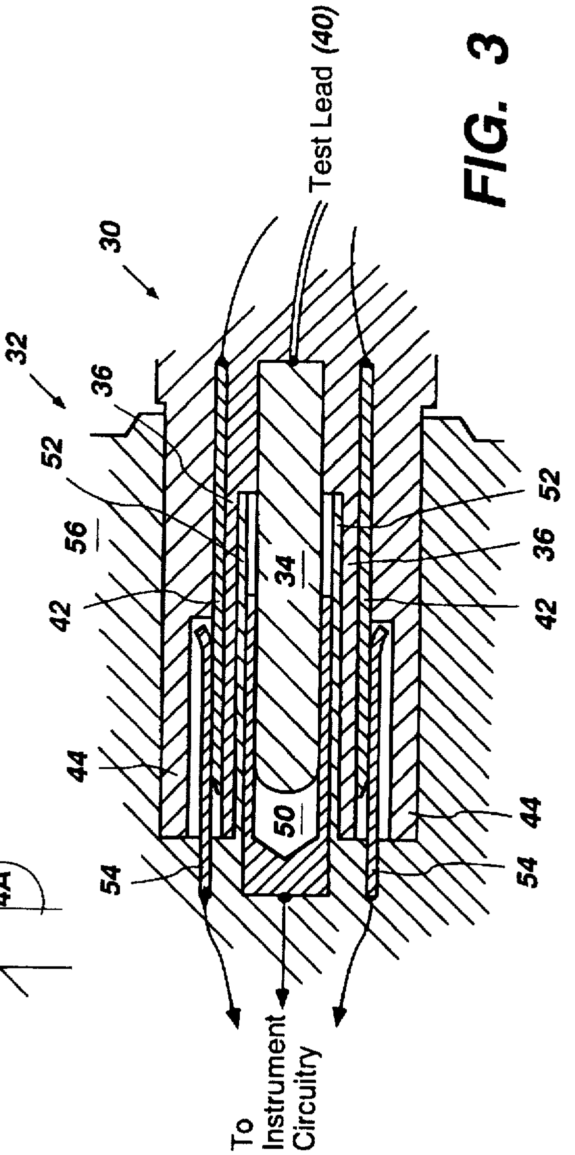
FIG. 3 is a sectional side view of the shielded banana plug and input receptacle of FIG. 2 shown in their mated relationship.

As illustrated in FIG. 3, plug 30 and receptacle 32 are dimensioned so that when they are mated, the receptacle 32 receives the plug 30. Inner conductor 34 is received and makes electrical contact with inner sleeve 50. Inner shroud 36 and shield 42 of the plug are received by the cavity between shroud 52 and sleeve 54 of the receptacle. Outer shroud 44 is received in the cavity formed by the case 56 and outer sleeve 54. Shield 42 is in electrical contact with outer sleeve 54. Thus, when plug 30 is fully seated in receptacle 32, the conductor and shield of the test lead cable are electrically connected to the circuitry of the instrument. When the plug 30 and receptacle 32 are not connected, or as they are being connected, the shrouds 36, 44 on plug 30 and the shroud 52 and case 56 of the receptacle 32 provide a degree of safety by preventing the user from touching the conductive portions of the plug or receptacle.

Figure 4B:
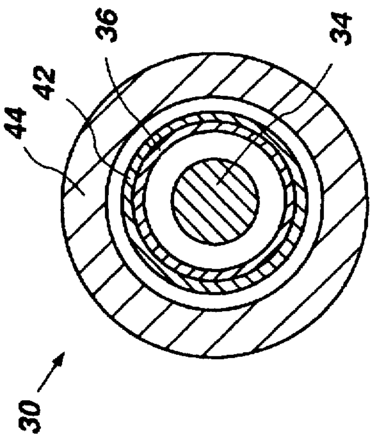
FIGS. 4A and 4B are respective end views of the input receptacle and shielded banana plug of FIG. 2; and, FIG. 5 is a sectional side view of a conventional, nonshielded banana plug mated with the input receptacle according to the present invention.
Figure 4A:
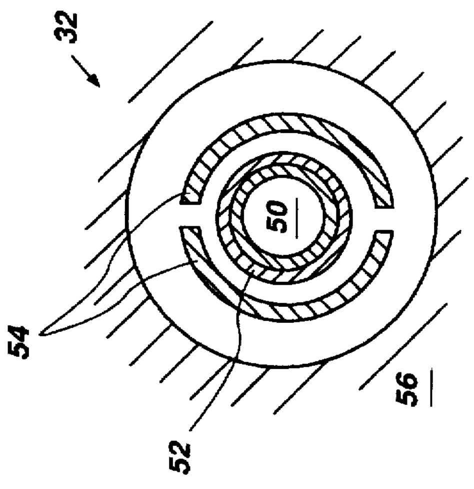

Turning to FIGS. 4A and 4B, the receptacle 32 and shielded plug 30 are depicted in end views. In accordance with a preferred embodiment, and as shown in FIGS. 4A and 4B, the shielded banana plug 30 and input receptacle 32 have a circular shape in the end view and are generally comprised of concentric circular rings of conductive and nonconductive materials.

Beginning at the center of the receptacle 32 in FIG. 4A and proceeding outward, inner sleeve 50 is surrounded by shroud 52. Outer sleeve 54 is concentric with inner sleeve 50 and is outside and spaced apart from shroud 52. In accordance with the preferred embodiment, outer sleeve 54 is split to form two sections. Splitting sleeve 54 permits multiple return paths to instrument circuitry and allows an instrument to process additional information, such as whether a test lead in plugged into the receptacle. The split feature of sleeve 54 is, however, not a critical element of the present invention. Finally, case 56 is concentric with and spaced apart from the sleeve 54.

Turning to the plug 30, as shown in FIG. 4B, the inner conductor 34 is at the center of plug 30. Inner shroud 36 is concentric with and spaced apart from inner conductor. Conductive shield 42 is concentric with and surrounds inner shroud 36. Outer shroud 44 is concentric with and spaced apart from shield 42.

Figure 5:
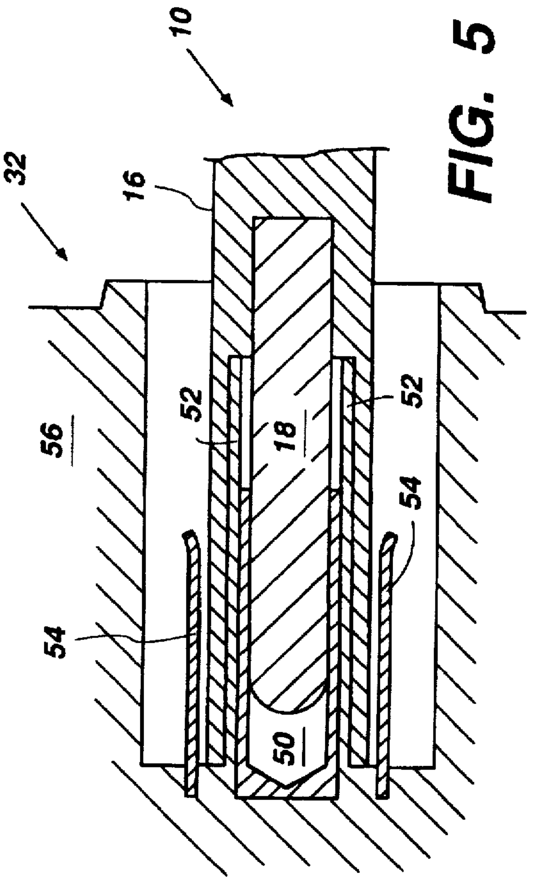

Input receptacle 32 is also suitable for receiving a conventional, nonshielded banana plug. This feature is best shown in FIG. 5. The inner conductor 18 of a conventional, nonshielded banana plug 10 is received by, and is in electrical contact with inner sleeve 50. Shroud 16 of the plug 10 is received in the cavity between outer sleeve 54 and inner sleeve 52 of receptacle 32. Accordingly, an instrument that has input receptacles according to the present invention, may use test leads having either conventional banana plugs or the shielded banana plugs of the present invention.

While a preferred embodiment has been illustrated and described, it will be appreciated that various changes can be made without departing from the spirit and scope of the present invention. For example, while the input receptacle and shielded banana plug need to have compatible shapes and dimensions so that they may be mated, they do not necessarily need to have a circular cross section. Further, the relative spacing between the various parts of the plug and receptacle may be different than as shown and discussed. The inner conductor is depicted as solid for purposes of clarity, but may be either solid or hollow. Consequently, the invention can be practiced otherwise than as specifically described herein.

I claim:

1. A connection system for an instrument and test leads comprising:

(a) a shielded banana plug having:
(i) an inner conductor,
(ii) a first shroud spaced apart from said inner conductor,
(iii) a conductive shield surrounding said first shroud, and
(iv) a second shroud spaced apart from said shield; and, (b) an input receptacle having:
i) an inner sleeve having an open end for receiving said inner conductor,
(ii) a nonconductive shroud substantially surrounding said inner sleeve, and
(iii) a conductive shroud spaced apart from and substantially surrounding said nonconductive shroud for engaging said conductive shield when said plug is inserted into said receptacle.

2. A connection system according to claim 1, wherein said first shroud of said shielded banana plug extends beyond an end of said inner conductor.

3. A connection system according to claim 2, wherein said conductive shield of said shielded banana plug terminates short of an end of said first shroud.

4. A connection system according to claim 3, wherein said second shroud of said shielded banana plug extends beyond an end of said conductive shield.

5. A connection system according to claim 4, wherein said nonconductive shroud of said input receptacle extends beyond said open end of said inner sleeve.

6. A connection system according to claim 1, wherein said inner conductor, first shroud, conductive shield, and second shroud are substantially coaxial.

7. A connection system according to claim 6, wherein said inner sleeve, nonconductive shroud, and conductive shroud are substantially coaxial.

* * * * *